United States Patent
Jeon et al.

(10) Patent No.: US 6,741,008 B2
(45) Date of Patent: May 25, 2004

(54) STATOR FOR RECIPROCATING MOTOR

(75) Inventors: Si-Hang Jeon, Busan (KR); Hyung-Pyo Yoon, Changwon (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/312,391

(22) PCT Filed: May 24, 2001

(86) PCT No.: PCT/KR01/00866

§ 371 (c)(1), (2), (4) Date: Dec. 26, 2002

(87) PCT Pub. No.: WO02/095909

PCT Pub. Date: Nov. 28, 2002

(65) Prior Publication Data

US 2003/0102725 A1 Jun. 5, 2003

(51) Int. Cl.$^7$ ................................................. H02K 1/12
(52) U.S. Cl. ........................ 310/254; 310/258; 310/259
(58) Field of Search ................................ 310/254, 258, 310/259, 216, 217, 218, 194

(56) References Cited

U.S. PATENT DOCUMENTS

| 4,827,163 A | 5/1989 | Bhate et al. | 310/15 |
| 4,937,481 A | 6/1990 | Vitale | 310/15 |
| 6,060,810 A | * 5/2000 | Lee et al. | 310/254 |
| 2002/0135264 A1 | * 9/2002 | Song et al. | 310/254 |

FOREIGN PATENT DOCUMENTS

| EP | 994253 A2 | 4/2000 |
| KR | 97-59497 A | 8/1997 |
| KR | 98-20961 U | 7/1998 |
| KR | 98-66464 U | 12/1998 |

* cited by examiner

Primary Examiner—Thomas M. Dougherty
Assistant Examiner—Leda T. Pham
(74) Attorney, Agent, or Firm—Birch, Stewart, Kolasch & Birch, LLP

(57) ABSTRACT

A stator of a reciprocal motor includes a bobbin of insulating material with a coil wound thereon, a terminal unit formed integrally with the bobbin to connect the coil to an external power source, a first lamination core in which a plurality of lamination sheets of a predetermined form are stacked radially along the bobbin, and a second lamination core in which a plurality of lamination sheets formed to have a certain width and length and located symmetrically on the central line in the direction of the length, are coupled with the inner side or outer side of the first lamination core. Therefore the present invention makes the laminating operation simple and convenient by laminating the plurality of lamination sheets composing the laminate core without sorting the lamination sheets in a certain direction during the production of the lamination core thus to improve assembly productivity and mass productivity.

4 Claims, 5 Drawing Sheets

STATOR FOR RECIPROCATING MOTOR

This application is the national phase under 35 U.S.C. §371 of PCT International Application No. PCT/KR01/00866 which has an International filing date of May 24, 2001, which designated the United States of America.

TECHNICAL FIELD

The present invention relates to a stator for a reciprocating motor, and particularly, to a stator for a reciprocating motor of which components can be fabricated in simple way.

BACKGROUND ART

Generally, a motor is a device for changing electric energy into kinetic energy, and can be classified into a rotary motor changing the electric energy into rotating movements and a reciprocating motor changing the electric energy into linear reciprocating movements.

The motor can be used in various fields as a power source. Especially, the above motor is applied to most electric devices such as refrigerator, air conditioner, etc.

In the refrigerator and the air conditioner, the motor is used to rotate a blast fan, however, it can be also used as a power source by being mounted on a compressor of cooling cycle device included in the refrigerator and the air conditioner.

FIGS. 1 and 2 are showing an example of a reciprocating motor under development by the present applicant. As shown therein, the reciprocating motor comprises: a bobbin 100 of ringular shape having a coil 110 wound therein; a terminal portion formed on one side of the bobbin 100 for electrically connecting the coil 110 wound in the bobbin 110 to outer electric source; an outer core 200 in which a plurality of lamination sheets 210 which are thin plates of U-shape are laminated in radial direction so as to make a cylindrical shape centering around the bobbin 100; an inner core 300, in which a plurality of lamination sheets 310 having predetermined area and length, and having asymmetric upper and lower parts centering around length direction are laminated in radial direction so as to make a cylinder shape, inserted into the outer core 200; and an armature 400 inserted between the outer core 200 and the inner core 300.

The outer core 200 and the inner core 300 including the bobbin 100 construct a stator (S).

On the other hand, the inner core 300 may be located on an outer side of the outer core 200. That is, the bobbin 100 is located on the inner core 300 side, and the bobbin 100 may not be included in the outer core 200.

The lamination sheets 210 constructing the outer core 200 are laminated so that the bobbin 100 can be inserted into opening recess (H) formed inside of the lamination sheet 210. In addition, both ends of the lamination sheet 210 are pole portion 211 forming the poles, and remained part is path portion 212 on which flux flows.

The lamination sheet 310 constructing the inner core 300 is formed to have long portion facing the lamination sheet 210 of the outer core 200, short opposite portion, and coupling recesses 311 with opened ends formed on both end portions of the lamination sheet.

The armature 400 comprises a magnet holder 410 of cylindrical shape and a plurality of permanent magnets 420 fixedly coupled on an outer circumferential surface of the magnet holder 410.

In addition, as shown in FIG. 3, a laminated body (L) which is made by laminating the plurality of lamination sheets 310 in radial direction to make a cylinder shape is fixedly coupled by press-fitting a fixing ring 312 of ringular shape into a ring coupled recess 311 of ringular shape formed by a concave recess of the lamination sheets.

Unexplained reference numeral 220 represents a fixing ring of the outer core.

As shown in FIG. 4, when electric current is flowed on the winding coil 110, a flux is formed around the winding coil 110 by the electric current flowing on the winding coil 110, and the flux flows along with the outer core 200 and the inner core 300 as forming a closed loop.

The armature 400 is moved toward a center axis direction by an interaction between the flux caused by the current flowing on the winding coil 110 and the permanent magnet 420 constructing the armature 400.

In addition, when the direction of electric current flowing on the winding coil 110 is changed, the direction of the flux formed on the outer core 200 and the inner core 300, and the armature 400 moves toward opposite direction.

When the electric current is supplied as changing its direction, the armature 400 undergoes linear reciprocating movements between the outer core 200 and the inner core 300. Accordingly, the armature 400 is to have linear reciprocating power.

On the other hand, since the outer core 200 and the inner core 300 making the stator (S) are constructed by the laminated body of the plurality of lamination sheets, the loss of flux flowing on the stator can be reduced.

However, according to the above conventional structure, when the stator (S) is fabricated, the lamination sheet 310 constructing the inner core 300 in the stator (S) is formed as an asymmetric shape for a center line in length direction, and therefore, the directions of the lamination sheets 310 should be coincided and laminated in laminating the plurality of lamination sheets 310 as a cylinder shape. Thus, the laminating operation is complex, and productivity is lowered and it is not suitable for mass production.

TECHNICAL GIST OF THE PRESENT INVENTION

Therefore, an object of the present invention is to provide a stator for a reciprocating motor of which components can be fabricated in simple way and assembling property can be improved.

In order to achieve the above objects, there is provided a stator for a reciprocating motor comprising: a bobbin of insulating material on which a coil is wound; a terminal portion formed integrally with the bobbin for electrically connecting the coil to outer electric source a first lamination core in which a plurality of lamination sheets formed as thin plates of predetermined shape are laminated in radial direction along with the bobbin; and a second lamination core, in which a plurality of lamination sheets formed to have predetermined area and length and formed to have symmetric upper and lower sides for a center line of length direction are laminated in radial direction to make a cylinder shape, coupled to the first lamination core to be located on inner or outer side of the first lamination core.

MODE FOR CARRYING OUT THE PREFERRED EMBODIMENTS

The present invention will now be described with reference to accompanying drawings.

Figure 1:
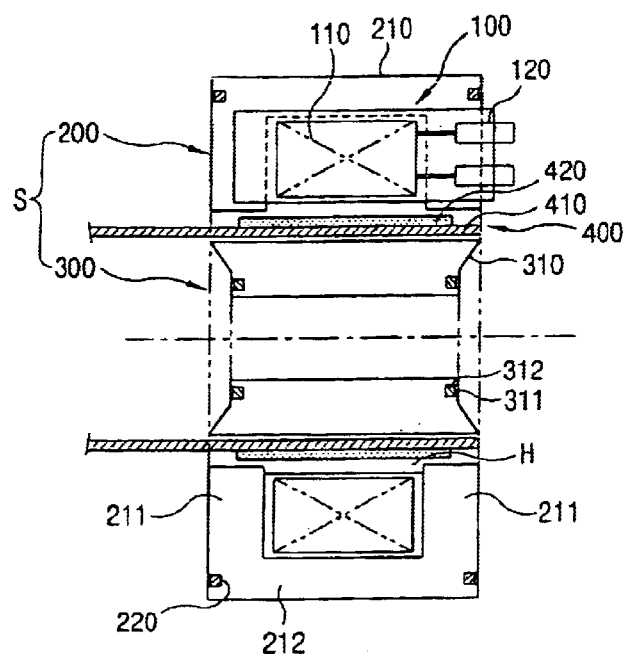
FIG. 1 is a front cross-sectional view showing a reciprocating motor under development.
Figure 2:
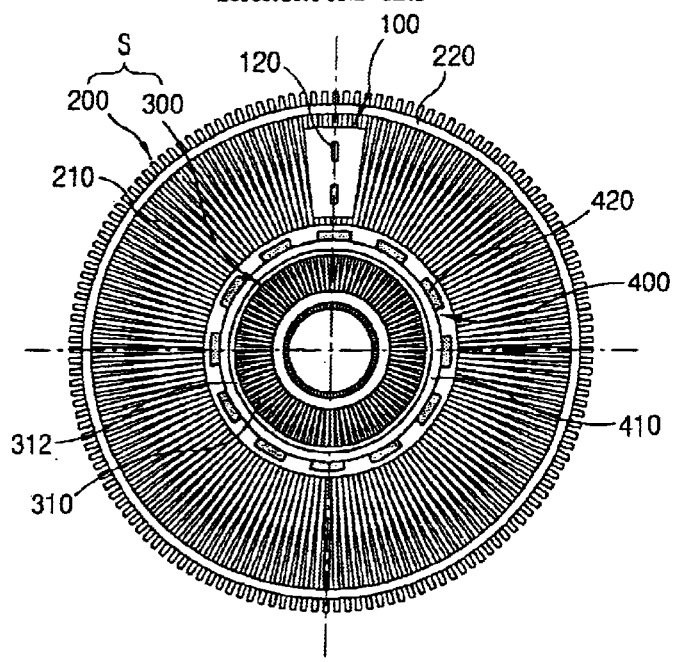
FIG. 2 is a side view showing the reciprocating motor under development.
Figure 3:
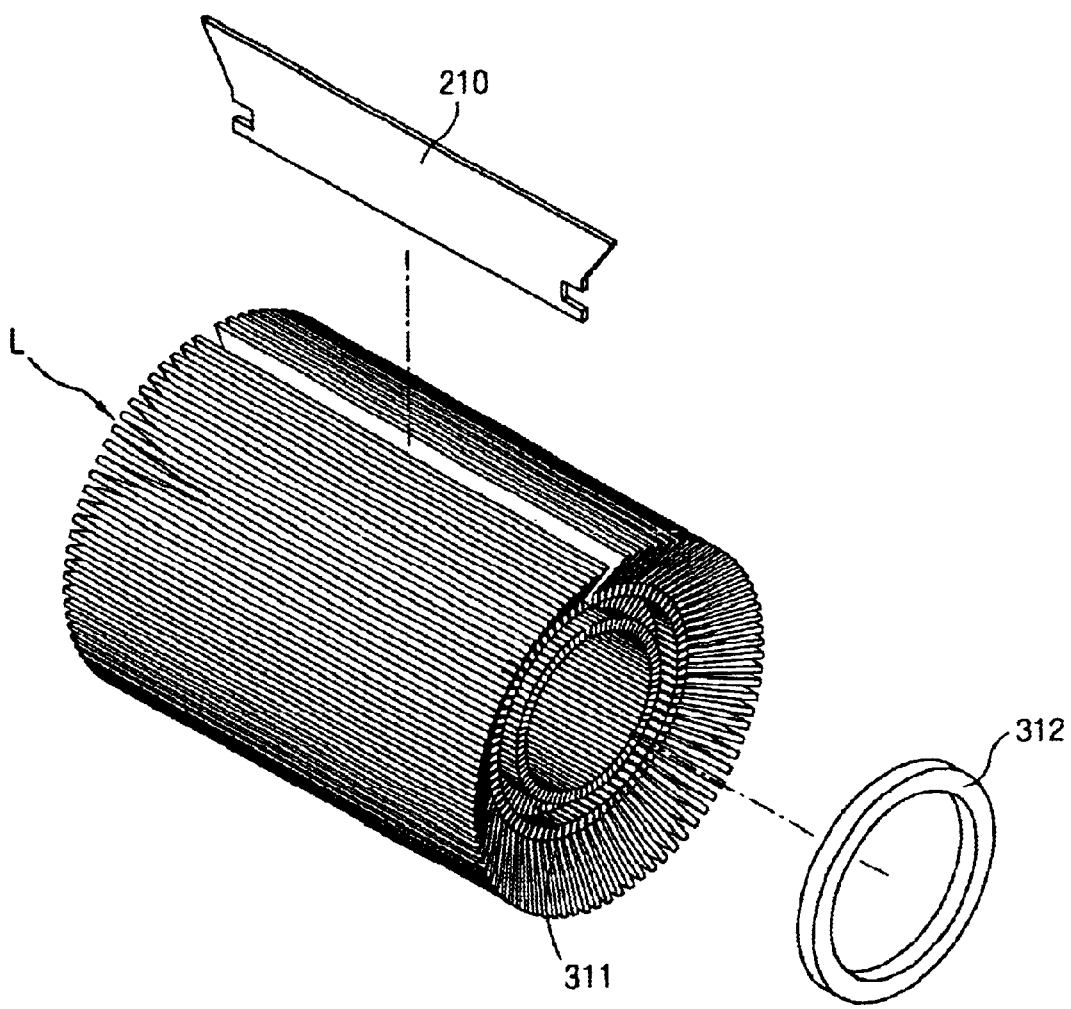
FIG. 3 is a perspective view showing an inner core constructing the reciprocating motor under development.
Figure 4:
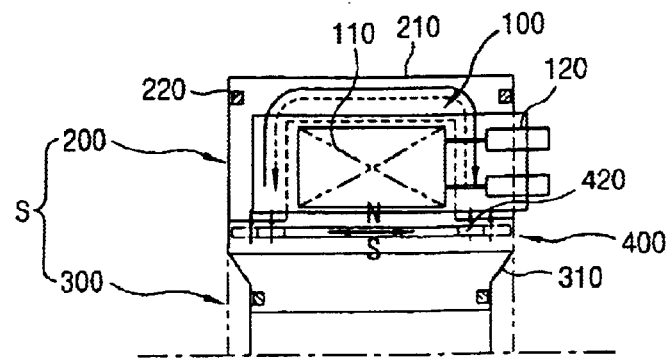
FIG. 4 is a front cross-sectional view showing operational status of the reciprocating motor under development.
Figure 5:
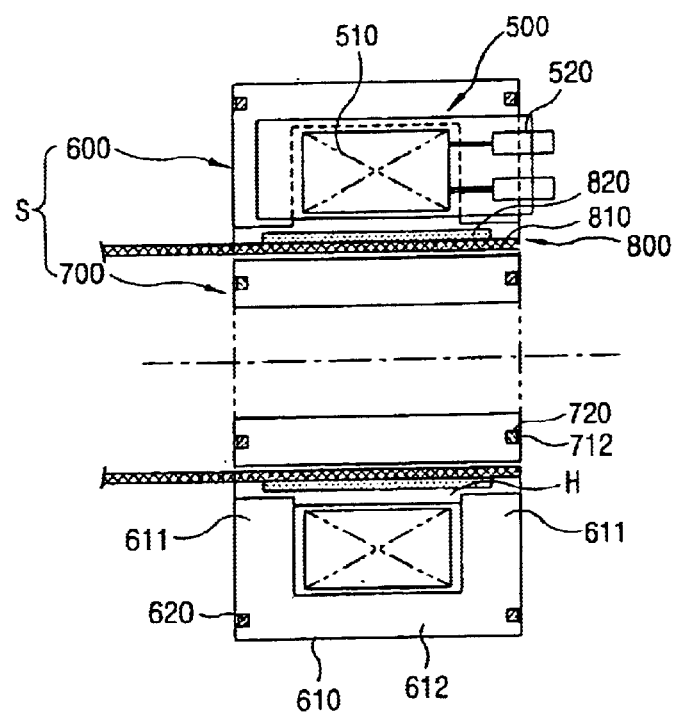
FIG. 5 is a front cross-sectional view showing a reciprocating motor including a stator according to the present invention.

FIG. 5 shows a reciprocating motor including an embodiment of a stator according to the present invention. As shown therein, in the reciprocating motor, a terminal portion 520 for electrically connecting a coil 510 to outer electric source is formed integrally on an insulating bobbin 500 on which a coil 510 is wound.

In addition, a first lamination core 600 is coupled to outer side of the bobbin 500, and the first lamination core 600 is a laminated body in which a plurality of lamination sheets 610 formed as thin plates of U-shape are laminated in radial direction along with the bobbin 500.

The plurality of lamination sheets 610 constructing the first lamination core 600 are laminated from one side surface of the terminal portion 520 to another side surface of the terminal portion 520 so that the bobbin 500 can be inserted into an opened recess (H) formed in the lamination sheets 610. In addition, both ends of the lamination sheets 510 become a pole portion 611, and remained part becomes a path portion 612 on which the flux flows.

In addition, a second lamination core 700 is inserted into the first lamination core 600 with a predetermined gap therebetween.

Figure 6:
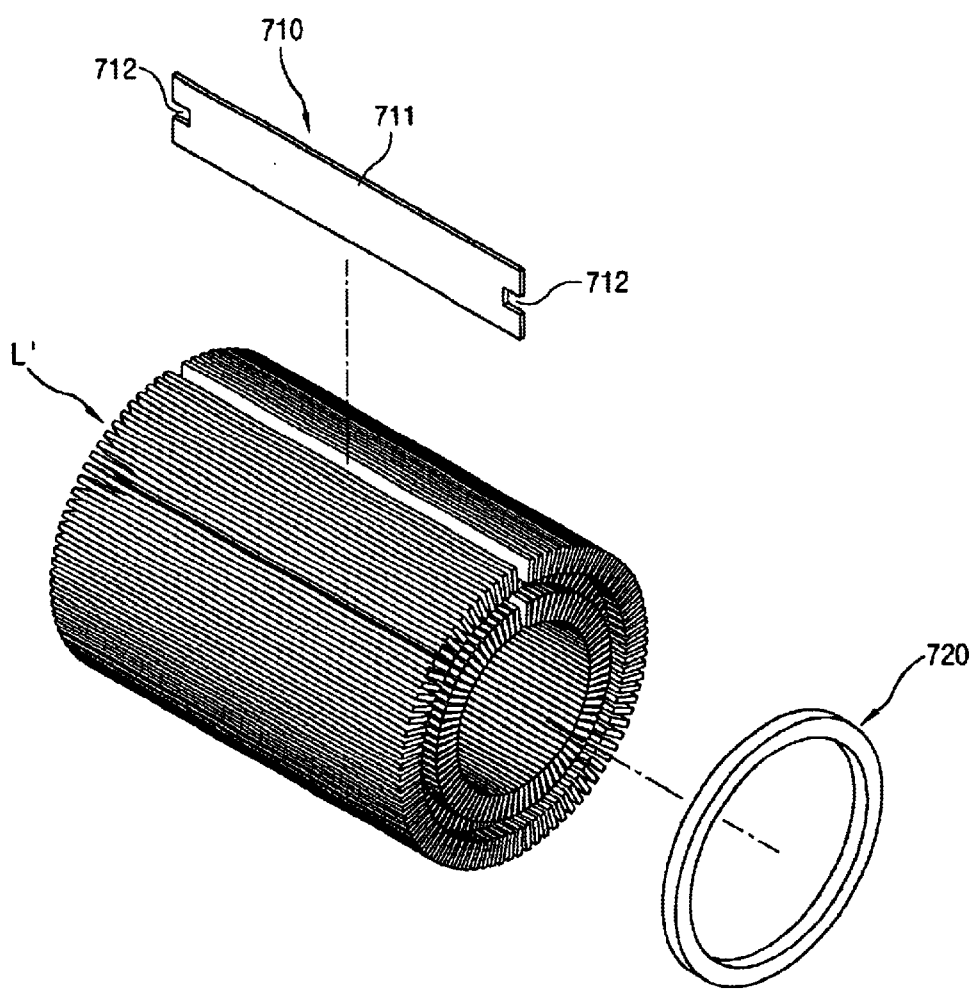
FIG. 6 is a perspective view showing the stator of the reciprocating motor according to the present invention.

As shown in FIG. 6, the second lamination core 700 comprises a laminated body L' which is made by laminating a plurality of lamination sheets 710, of which upper and lower sides are formed to have symmetric structure for center line in length direction, in radial direction to make a cylinder shape, and a fixing ring 720 for fixing the laminated body L'.

Also, the lamination sheet 710 constructing the second lamination core 700 is formed to have symmetric structure in left-and-right sides based on a vertical center line for the length direction.

The lamination sheet 710 constructing the second lamination core 700 is made by forming a square plate body portion 711 of rectangular shape having a predetermined area and length, and forming ring insertion recesses 712 having predetermined width and depth on both ends of a center line in length direction of the square plate body portion 711.

The lamination sheets 710 are laminated in radial direction to make a cylindrical shape, and after that, the fixing ring 720 of ringular shape is press-fitted into a recess of ringular shape formed by the ring insertion recesses 712 of the plurality of lamination sheets 710.

Figure 7:
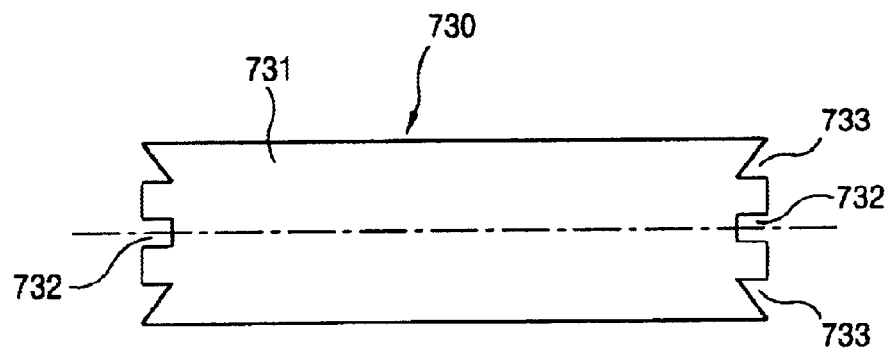
FIG. 7 is a front view showing another example of a lamination sheet constructing the stator of the reciprocating motor according to the present invention.

Also, as another example of the second lamination core 700, the lamination sheet 730 may be formed by a square plate body portion 731 of rectangular shape having a predetermined area and length, ring insertion recesses 732 formed on both ends of a center in length direction of the square plate body portion 731 to have a predetermined width and depth, and a cut recesses 733 formed on upper and lower sides of the ring insertion recesses 732 respectively to make corners of the square plate body portion 731 be acute angles, as shown in FIG. 7. It is desirable that the cut recesses 733 are formed as triangles.

In addition, an armature 800 is inserted between the first lamination core 600 and the second lamination core 700. The armature 800 comprises a magnet holder 810 formed as a cylinder and a plurality of permanent magnets 820 fixedly coupled on an outer circumferential surface of the magnet holder 810.

Figure 8:
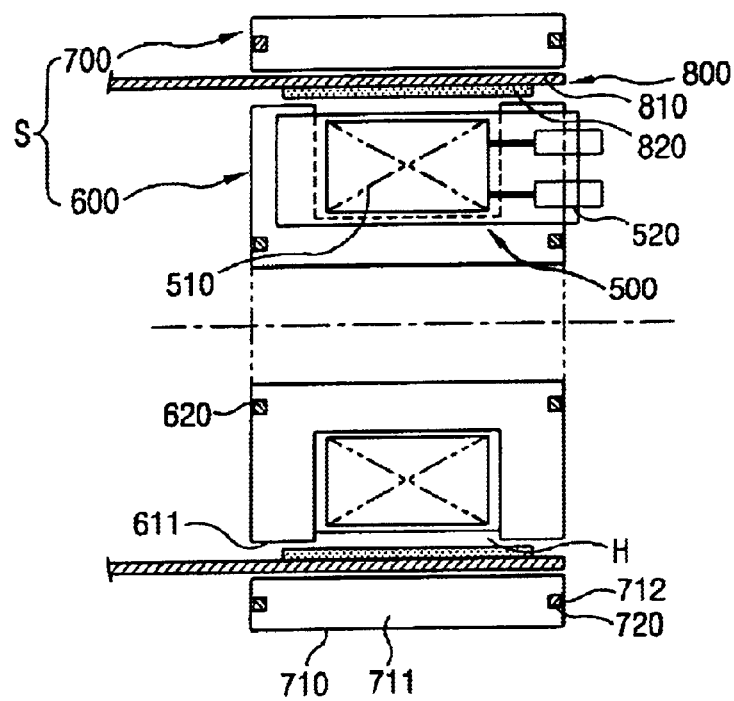
FIG. 8 is a cross-sectional view showing another embodiment of the reciprocating motor according to the present invention.

Also, as another embodiment of the present invention, the stator for the reciprocating motor comprises: a bobbin 500 of insulating material on which a coil 510 is wound; a terminal portion 520 formed integrally with the bobbin 500 for electrically connecting the coil 510 to outer electric source; a first lamination core 600 in which a plurality of lamination sheets 510 formed as thin plates of predetermined shapes are laminated in radial direction along with the bobbin 500; and a second lamination core 700, in which a plurality of lamination sheets 710 having predetermined area and length and having symmetric structure in up-and-down direction for a center line of length direction are laminated in radial direction to make a cylinder shape, coupled to the first lamination core 600 to be located on outer side of the first lamination core 600, as shown in FIG. 8.

That is, the first lamination core 600 is inserted into the second lamination core 700 with a predetermined gap therebetween.

Also, left and right sides of the lamination sheet 710 constructing the second lamination core 700 is formed to be symmetric based on a vertical center line for the length direction.

That is, the lamination sheet 710 constructing the second lamination core 700 is formed by a square plate body portion 711 of rectangular shape having predetermined area and length, and by ring insertion recesses 712 having a predetermined width and depth formed on both ends of the center in length direction of the square plate body portion 711.

In addition, the armature 800 is inserted between the first lamination core 600 and the second lamination core 700.

Hereinafter, operation and effect of the stator for the reciprocating motor will be described as follows.

When the electric current is flowed on the winding coil 510 located in the bobbin 500, the flux flows along with the first lamination core 600 and the second lamination core 700 by the current flowing on the winding coil 510 as forming a closed loop.

The armature is moved toward the center axis by an interaction between the flux caused by the electric current flowing on the winding coil 510 and the permanent magnets 820 constructing the armature 800.

In addition, when direction of the electric current flowing on the winding coil 510 is changed, direction of the flux formed on the first lamination core 600 and the second lamination core 700 is changed, and therefore, the permanent magnets 820 are moved toward opposite direction.

As described above, when the electric current is supplied as changing its direction, the armature 800 undergoes linear reciprocating movements between the first lamination core 600 and the second lamination core 700.

On the other hand, since the plurality of lamination sheets 710 constructing the second lamination core 700 are formed to have symmetric structure in up-and-down, and left-and-right directions on the basis of the center line in length direction, the lamination sheets 710 do not have directional property when the sheets are laminated in radial direction, and therefore, the lamination sheets 710 can be laminated without arranging them in a predetermined direction.

In addition, in case of the second lamination core 700 in which a plurality of lamination sheets 730 having cut recesses 733 are laminated shown in FIG. 7, the flow of flux which is induced through the pole portion 611 of the first lamination core 611 can be smooth due to the form property.

INDUSTRIAL APPLICABILITY

As so far described, according to the stator for reciprocating motor of the present invention, a plurality of lamination sheets constructing the radial laminated body are constructed so that the upper and lower sides of the sheets are symmetric for the center line in length direction, and therefore, the plurality of lamination sheets can be laminated without arranging them toward a certain direction. Thus, the laminating operation can be made simply and conveniently to improve the assembling productivity, and to increase mass productivity.

What is claimed is:

1. A stator for a reciprocating motor comprising:
   a bobbin of insulating material on which a coil is wound;
   a terminal portion formed integrally with the bobbin for electrically connecting the coil to an external electric source;
   a first lamination core having a plurality of lamination sheets formed as thin plates with predetermined shapes are laminated in a radial direction along with the bobbin; and
   a second lamination core having a plurality of lamination sheets, wherein each sheet of said lamination sheets of said second lamination core have a predetermined area and length, and a symmetric structure with respect to an up-and-down direction of an axial centerline of said stator, said lamination sheets of said second lamination core being laminated in a radial direction to form a cylindrical shape and being coupled to the first lamination core to be located on an inner or an outer side of the first lamination core.

2. The stator according to claim 1, wherein upper and lower sides of the lamination sheets constructing the second lamination core are formed to be symmetric based on a vertical center line with respect to a length direction.

3. The stator according to claim 1, wherein the lamination sheets of the second lamination core are each formed by forming a square plate body portion of rectangular shape having a predetermined area and length, and by forming ring insertion recesses having a predetermined width and depth on both ends of the square plate body portion at an axial center of the square plate body portion.

4. The stator according to claim 1, wherein the lamination sheets of the second lamination core each include a square plate body portion of rectangular shape having a predetermined area and length, ring insertion recesses having a predetermined width and depth formed on both ends of the square plate body portion at an axial center center of the square plate body portion, and cut recesses formed on upper and lower sides of the ring insertion recesses respectively for forming corners of the square plate body portion at acute angles.

* * * * *